Figure 1:
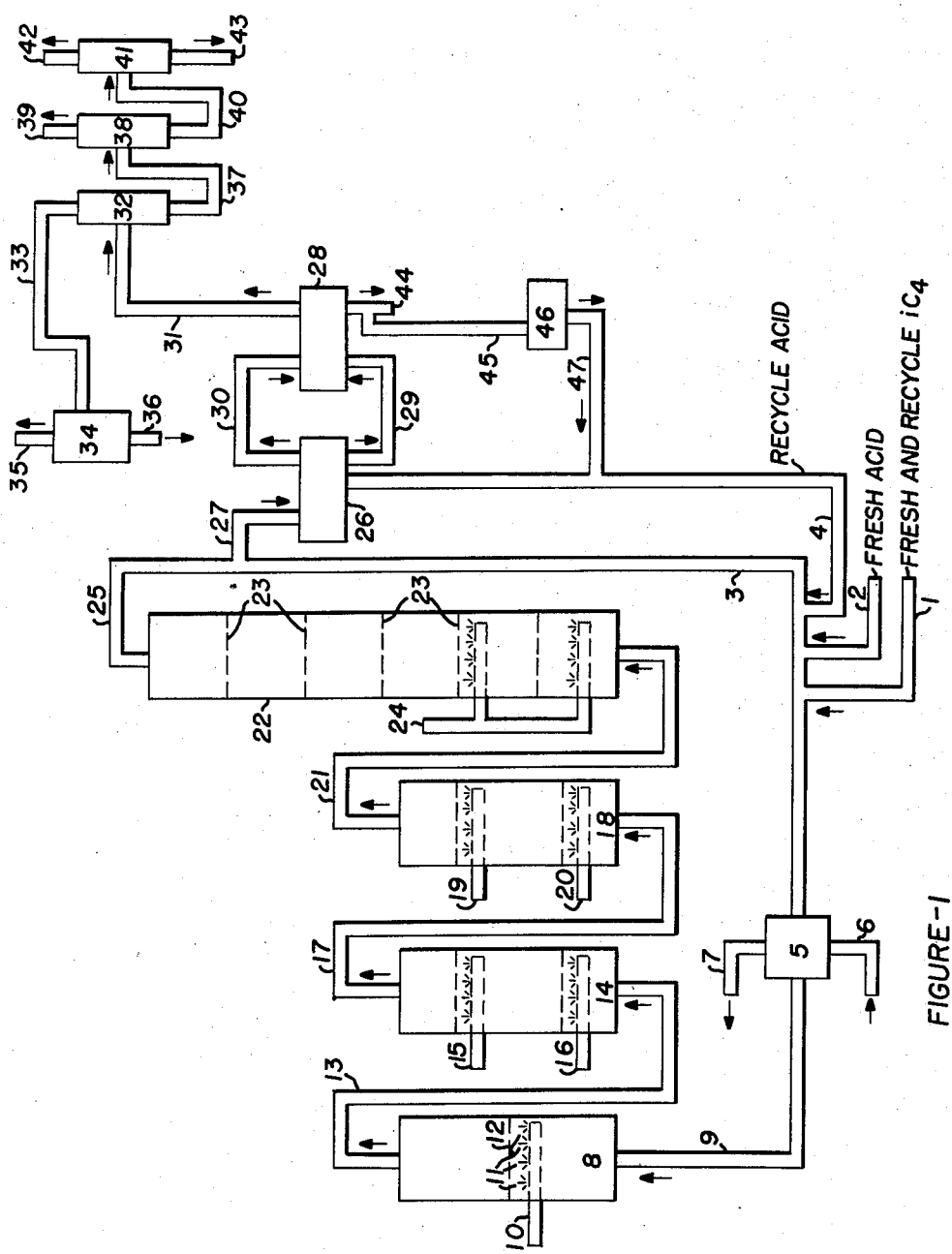

United States Patent Office 2,906,610
Patented Sept. 29, 1959

2,906,610
RECOVERY OF ALKYLATION ACID

William L. Clinkenbeard, Roselle, Walter F. Rollman, Millburn, and Albert B. Welty, Jr., Westfield, N.J., assignors to Esso Research and Engineering Company, a corporation of Delaware Application January 5, 1956, Serial No. 557,507

5 Claims. (Cl. 23—295)

The present invention is broadly concerned with a process and apparatus for effecting reactions between hydrocarbon constituents in the presence of a catalyst promoting the reaction. The invention is more particularly concerned with the manufacture of hydrocarbons having branched chain structures which are especially suitable as high octane number fractions for aviation and automotive fuels. Specifically, the invention is concerned with an improved method of treating the spent alkylation acid catalyst in order to reduce the consumption and loss of the acid catalyst.

This invention relates especially to means for reacting certain isoparaffin hydrocarbons with olefins to produce improved yields of branched chain paraffinic hydrocarbons boiling within the gasoline range, as in the alkylation of isobutane with butylene in the presence of sulfuric acid as a catalyst material. Although thus specifically applied, the invention contemplates the employment of any suitable hydrocarbon material including isobutane, isopentane and other paraffinic materials capable of chemical combination with olefins to obtain products of the characters desired.

Characteristically, the olefinic materials contemplated by the present invention and capable of entering into an alkylation reaction with isoparaffinic hydrocarbons may also be polymerized by contact with the catalyst materials such as may be employed for alkylation. This characteristic is due primarily to the greater reactivity of the olefins as compared with the isoparaffins and, in order to avoid the preferential polymerization reaction, or at least to reduce it to a minimum when alkylation is desired, various process expedients have been employed. A most conventional procedure to inhibit concurrent polymerization as well as to prevent other undesirable secondary or side reactions has been to effect catalytic alkylation reactions under conditions designed to avoid intimate contact of the olefins with the catalyst material in the comparative absence of isoparaffins. To accomplish this, it has been customary to provide a substantial excess of isoparaffins in the reaction zone or to dilute the olefin material with a material containing a substantially greater amount of isoparaffins prior to introduction into the reaction zone. For example, the olefin material may be introduced in successive increments in a continuous series of reaction zones or stages containing previously emulsified and contacted materials. Under such procedures, it is frequently difficult to adequately control the quantities of the various materials introduced, or their relative proportions in any stage, and also the degree of emulsification or mixing which is accomplished from stage to stage. As a result, there may be areas in any particular zone or stage in which the olefins may come in contact with substantially unemulsified or free catalyst materials to produce the undesired polymerization or other side reactions, and thereby to reduce the yield of alkylation products.

Figure 2:
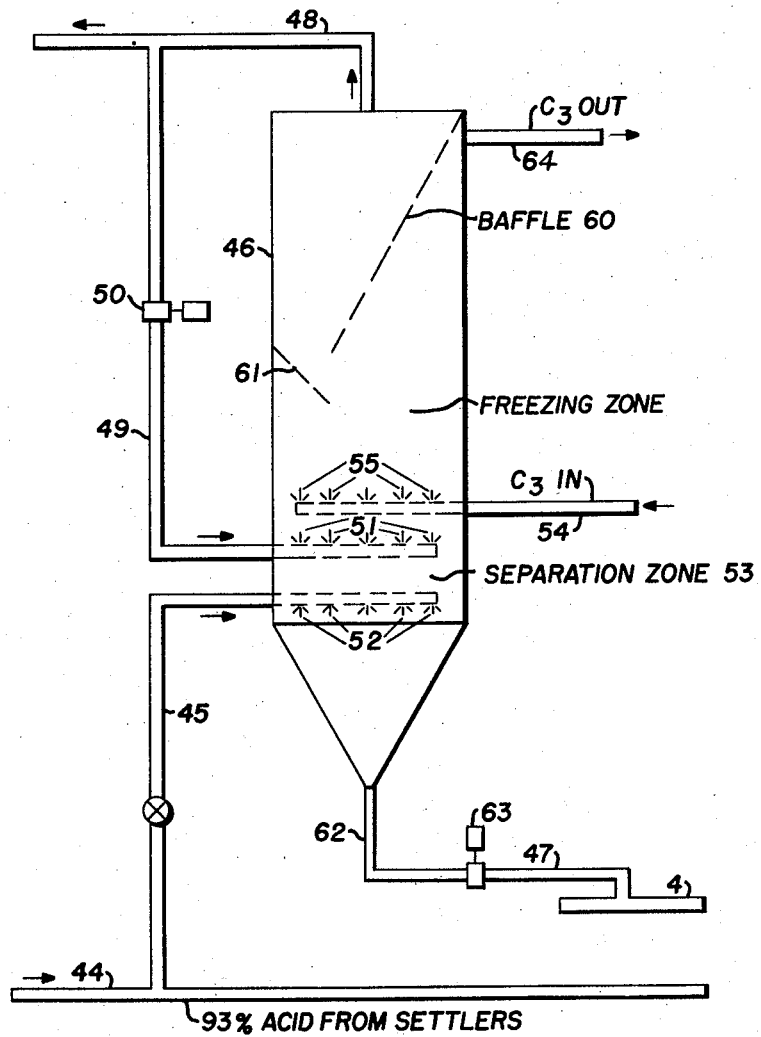

The process of the present invention wherein the acid catalyst is more effectively handled, may be fully understood by reference to the attached drawings illustrating one adaptation of the same. Figure 1 is a diagrammatical sketch illustrating the overall operation, while Figure 2 is specific to the improved acid recovery zone. Referring specifically to Figure 1, fresh and recycled isobutane are introduced into the system by means of feed line 1. A typical analysis of this stream is as follows:

| | Volume percent |
|---|---|
| Propane | 3 |
| Isobutane | 85 |
| n-Butane | 12 |

The catalyst, which is preferably sulfuric acid having a concentration in the range from about 95 to 99 wt. percent, is introduced into the system by means of line 2. Both the isobutane stream and the acid stream are introduced into a recycled emulsion stream 3 secured as hereinafter described. The composition of this recycled emulsion stream is typically as follows:

| | Volume percent |
|---|---|
| Acid ($H_2SO_4$) | 50 |
| Hydrocarbon | 50 |

A recycle acid stream 4 secured as hereinafter described and having a concentration within the range of from about 90 to 93%, is likewise introduced into emulsion stream 3. The entire mixture is passed through a cooler 5 wherein the temperature is reduced to a temperature in the range from about 35° to 55° F. The cooler 5 may comprise a propane or equivalent cooler in which the propane is introduced by means of line 6, evaporated and withdrawn by means of line 7. The cooled mixture is then introduced into an initial mixing zone 8 by means of line 9. In this zone the emulsion mixture is intimately mixed with an olefin feed stream which is introduced through line 10 and a plurality of jets 11. In practice, a perforated plate 12 is positioned above the jets in order to secure more adequate mixing of the olefin feed stream and the emulsion. A typical olefin feed comprises about 30% butenes, about 40% isobutenes and about 30% normal butanes. The mixture is drawn overhead from initial mixing zone 8 by means of line 13 and introduced into a secondary mixing zone 14. In this zone additional olefin feed is introduced by means of lines 15 and 16 in a similar manner as that described with respect to mixing zone 8 wherein jets and perforated orifice plates are provided. The mixture is withdrawn overhead from zone 14 by means of line 17 and introduced into a tertiary mixing zone 18. Here additional olefin feed is introduced by means of lines 19 and 20 by jets and perforated plate elements, such as described with respect to zone 8. The mixture is withdrawn overhead from zone 18 by means of line 21 and introduced into reaction zone 22. The acid strength in the mixture withdrawn from zone 18 is typically about 90–94% acidity and at a temperature within the range from 35° to 60° F. The mixture flows upwardly through main reaction zone 22, through a series of perforated plate elements 23. If desired, additional olefin feed may be introduced by means of line 24, a suitable element and orifice plate, such as described with respect to zone 8.

A product emulsion is removed overhead from zone 22 by means of line 25 and a portion of the same recycled to zone 8 by means of line 3. The remainder is passed to a primary settling zone 26 by means of line 27 wherein a lower hydrocarbon-acid phase separates from an upper hydrocarbon phase. A portion of the lower phase is recycled to zone 8 by means of line 4 while the remainder may be passed to zone 28 by means of line 29.

The upper hydrocarbon phase from zone 26 is passed to zone 28 by means of line 30 wherein the same separates into a lower acid phase and an upper hydrocarbon phase. The upper hydrocarbon phase is removed by means of line 31 and passed to suitable distillation equipment for the segregation of the various hydrocarbons from the alkylate. A typical operation is to employ an initial isobutane tower 32 wherein isobutane and propane are removed overhead by means of line 33. Part of this stream is passed to a separation zone 34 wherein propane is removed overhead by means of line 35 and the isobutane by means of line 36. The isobutane from the depropanizer and the remainder of the isobutane tower overhead are recycled to the system. The bottoms fraction from distillation zone 32 is removed by means of line 37 and passed to a distillation zone 38 wherein normal butane is removed overhead by means of line 39. A bottoms fraction containing the alkylate is removed by means of line 40 and passed to a distillation zone 41 wherein the alkylate is removed overhead by means of line 42. This stream is advantageously blended as high octane number constituents with motor and aviation fuels. A bottoms fraction is removed by means of line 43 and handled as desired.

Spent acid is usually removed from the system by means of line 44 and disposed of as desired. However, in accordance with the present invention at least a portion of the acid phase from zone 28 is passed by means of line 45 to an acid recovery zone 46. In zone 46 the acid is partially frozen to segregate relatively pure acid which is returned to recycle line 4 by means of line 47. A portion of the impure acid constituents may be removed by means of line 44 and disposed of as desired.

Referring specifically to Figure 2 the operation of zone 46 is illustrated in detail. At least a portion of the recycled acid from line 44 is diverted by means of line 45. A typical acid has an acidity of about 93% and is at a temperature of about 50° F. This acid is introduced in the bottom of zone 46. The liquid constituents flow upwardly through zone 46 and are removed overhead by means of line 48 which comprises a spent acid stream which is not recycled to the alkylation system, but may be disposed of as desired. In general, this acid has a concentration of about 88% and is at a temperature of about 10° F. However, if desired, a portion of this acid may be recycled to zone 46 by means of line 49 and pump 50. This recycled acid stream to zone 46 is jetted upwardly by means of nozzle elements 51, while the acid introduced by means of line 45 is jetted downwardly by means of nozzle elements 52. A separation or a relatively quiescent zone 53 thus is positioned between the respective nozzle elements which jet in opposite directions. Propane is introduced into vessel 46 by means of line 54 and nozzle elements 55. The vaporization of the propane causes the entire mixture to be chilled to a temperature within the range of from about −30° F. to +25° F., preferably, to a temperature of about 10° F. Thus, crystals of, typically, 99% acid are formed and settle downwardly. Two oblique downwardly extending baffle elements 60 and 61 provide deterrents against the upflow of solid crystals. Baffle element 60 also serves to trap vaporous propane which can be withdrawn by means of line 64. In accordance with the present invention, there is withdrawn from the bottom of vessel 46 by means of line 62 and pump 63 and line 47 a relatively pure acid stream having an acidity of about 94–95% which is introduced into line 4 and recycled to the reactors.

As pointed out heretofore, the invention is generally concerned with the reaction of branched chain saturated paraffins, such as isoparaffins with olefins, using as a catalyst an acid such as sulfuric acid. The invention is particularly directed toward the reduction of acid consumption which constitutes a large cost in the operation. The acid is recovered as crystals in a particular vessel which permits rapid separation of the frozen crystals from undesirable constituents.

What is claimed is:

1. Apparatus for purifying spent sulfuric acid from an alkylation reaction which comprises a vertically disposed vessel, an inclined baffle positioned within the upper portion of said vessel and fixed at its upper end to the wall of the vessel, means for withdrawing liquid from said vessel above said baffle, means for withdrawing vapor from said vessel below said baffle and adjacent the upper end thereof, a first conduit for introducing recycled liquid from the top of said vessel into a lower section thereof, said first conduit terminating in at least one upwardly directed first nozzle within said vessel, a second conduit for introducing a liquefied refrigerant into said vessel above the point of introduction of said recycled liquid, said second conduit terminating in at least one upwardly directed nozzle positioned above said first nozzle, a third conduit for introducing spent acid into said vessel below the point of introduction of said recycled liquid, said third conduit terminating in at least one downwardly directed third nozzle vertically spaced below said first nozzle and means for withdrawing purified acid from said vessel below said third nozzle.

2. Apparatus as defined by claim 1 including a second downwardly extending inclined baffle fixed at its upper end to the wall of said vessel at a point opposite the point of attachment of said first baffle and terminating below the lower edge of said first baffle.

3. A process for purifying spent acid catalyst in the alkylation of isoparaffins with olefins which includes the steps of introducing said spent acid into the lower section of a purification zone in the form of at least one downwardly directed jet, withdrawing liquid from the top of the purification zone and reintroducing a portion of the withdrawn liquid into the lower section of said purification zone, above the point of introduction of said spent acid, in the form of at least one upwardly directed jet, introducing a liquefied normally gaseous hydrocarbon into said purification zone above the point of re-introduction of said withdrawn liquid, vaporizing the liquefied hydrocarbon within said purification zone and thereby effecting refrigeration of said zone, and withdrawing purified acid from said purification zone below the point of introduction of said spent acid.

4. Process as defined by claim 3 wherein said liquefied normally gaseous hydrocarbon comprises propane.

5. Process as defined by claim 3 wherein a temperature of from about −30° F. to about +25° F. is attained by said refrigeration.

References Cited in the file of this patent

UNITED STATES PATENTS

| | | |
|---|---|---|
| 2,267,458 | Goldsby | Dec. 23, 1941 |
| 2,584,877 | Hoffman et al. | Feb. 5, 1952 |
| 2,593,128 | Felter | Apr. 15, 1952 |
| 2,716,592 | Skelly et al. | Aug. 30, 1955 |